United States Patent
Pal et al.

(10) Patent No.: US 6,886,021 B1
(45) Date of Patent: Apr. 26, 2005

(54) METHOD FOR TRACKING AUDIT FILES SPANNING MULTIPLE TAPE VOLUMES

(75) Inventors: Suprio Pal, Corona, CA (US); P. J. Landresse, Capistrano Beach, CA (US); Vikki Mei-Whey Lai, Orange, CA (US)

(73) Assignee: Unisys Corporation, Blue Bell, PA (US)

( * ) Notice: Subject to any disclaimer, the term of this patent is extended or adjusted under 35 U.S.C. 154(b) by 503 days.

(21) Appl. No.: 09/997,750

(22) Filed: Nov. 27, 2001

(51) Int. Cl.[7] .............................................. G06F 17/30
(52) U.S. Cl. ...................... 707/204; 707/202; 707/203; 709/206; 709/227; 714/4; 714/6
(58) Field of Search ................................ 707/3, 4, 202, 707/203, 204, 10, 100, 200, 201, 205; 709/206, 227, 248; 714/4, 6, 19, 162

(56) References Cited

U.S. PATENT DOCUMENTS

| | | | |
|---|---|---|---|
| 5,287,232 A | | 2/1994 | Woo |
| 5,404,508 A | * | 4/1995 | Konrad et al. ............... 707/202 |
| 5,572,378 A | | 11/1996 | Schwarz et al. |
| 5,717,951 A | * | 2/1998 | Yabumoto ..................... 710/11 |
| 5,757,571 A | | 5/1998 | Basham et al. |
| 5,982,572 A | | 11/1999 | Dahlerud |
| 6,081,875 A | | 6/2000 | Clifton et al. |
| 6,085,200 A | * | 7/2000 | Hill et al. ..................... 707/202 |
| 6,324,548 B1 | * | 11/2001 | Sorenson ..................... 707/204 |
| 6,411,969 B1 | * | 6/2002 | Tam ........................... 707/204 |
| 6,446,090 B1 | * | 9/2002 | Hart ........................... 707/201 |

* cited by examiner

*Primary Examiner*—Charles Rones
*Assistant Examiner*—Jacques Veillard
(74) *Attorney, Agent, or Firm*—Alfred W. Kozak; Mark T. Starr; Lise A. Rode (57) ABSTRACT

The method of the present invention is useful in a computer system including a server accessing a database and connected to a magnetic tape drive and operates to expedite the retrieval of audit files on tape while performing a database recovery. The program executes a method for locating a group of audit files of a database that is backed-up on magnetic tape media. The method includes the steps of creating a Tapeset for the group of audit files, initializing a disk directory file which holds positional information of the Tapeset, and locating each of the audit files within the group of audit files using the positional information contained in the disk directory file.

11 Claims, 9 Drawing Sheets

METHOD FOR TRACKING AUDIT FILES SPANNING MULTIPLE TAPE VOLUMES

FIELD OF THE INVENTION

The present invention generally relates to the field of magnetic tape drives and in particular to an improved method for tracking audit files spanning multiple tape volumes.

BACKGROUND OF THE INVENTION

A namespace is a set of names in which all names are unique. Namespace management is a well-defined method of inserting and deleting names into the namespace (with no duplicate names) and an unambiguous method of tracking names in that namespace. In the computing world, namespace management schemes can be applied to managing multiple files, each with unique filenames.

For disk storage devices, the rules for managing the namespace are clear. The disk namespace is called a disk directory and the elements of a disk namespace are filenames and all of them have to be unique. The operating system provides efficient mechanisms for inserting/deleting files into the disk namespace and for filename searches. The second (and a very important) characteristic of disks is that the namespace (i.e. directory) is maintained on the same storage medium as the elements of the namespace (i.e. filename). The other characteristic of disk storage media is that they are not generally removable from a system and hence each individual disk device has its own unique name in a system.

Tape devices, on the other hand, differ significantly in terms of the characteristics mentioned above for disk devices. Tapes do not have a well-defined system providing a namespace management scheme. Users have to manage the namespace themselves. There are cataloging systems that do provide some form of management but they are limited when compared to disk namespace management systems. Moreover, tapes are removable storage media and hence the possibility of having duplicate copies of the same tapes is a distinct reality.

Tape devices prove to be extremely useful when dealing with audit files (also known as transaction logs) and database recovery. Audit files contain a history of the changes made to an audited database and are a necessary component of the database recovery process. If audit files are not available when a database failure occurs, all changes made to a database since the last backup dump was taken might be lost. Because audit files can contain information for millions of transactions, audit files tend to be large. It is common to store backup audit files on tapedrives rather than waste hard disk on the database system server.

Because of the important role tape devices play in database recovery, and the deficiencies of managing namespaces when dealing with tape devices, the need arises for maintaining and tracking files spanning multiple reels of tape.

The method of the present invention addresses this need by introducing the concept of a Tapeset, or a grouping of audit files on tape. The biggest advantage that can be derived from the method of the present invention is when new audit files are being appended to an existing Tapeset or when audit files are being retrieved. Tapes using the method of the present invention are created under the constraint that all audit files on the tape (which may span multiple reels) must be stored sequentially by audit file number. Consequently every command to append audit files to these tapes needs to be verified for the aforementioned constraint. This is done by verifying whether the previous audit file (by audit file number) for the database exists on some tape. If the constraint is verified, the method of the present invention then positions the tape just beyond the end of that file to prepare for appending the new audit file.

In the prior art, this was done by simply calling an operating system function to open the previous audit file. In other words, if audit file #5 was being appended then the prior art utility invoked an operating system function to open audit file #4. If audit file #4 is found, another operating system function (close with retention) is invoked to position the tape just beyond the end of the file.

Now, in today's data center environments with the multitude of tape drive hardware and the possibility of multiple audit tapes being mounted on that hardware, it took an inordinate amount of time for the operating system to open the requested audit file. This is because the operating system sequentially scanned thru all the mounted audit tapes of the database for the requested file. In many cases, several tape volumes have to be searched sequentially before the right tape volume with the audit file in question is found (Problem #1). This problem is extremely aggravated by the high capacity of today's tapes. Sometimes, scanning thru an entire reel of tape takes more than an hour just to determine whether a particular file is present on the tape (Problem #2). In addition, if the audit file whose presence was being verified (in our case: audit file #4) were huge and worse, if it spanned multiple reels, it would involve another large chunk of elapsed time to be taken for positioning the tape drive at the end of the file (Problem #3).

In the method of the present invention, the concept of the Tapeset is invoked again. If the "Append Command" is issued by the operating system (DBMS software), the current Tapeset number stored in the system control file for the database is used. If the Append Command is issued by the operator, the Tapeset number has to be supplied.

One prior art method to which the method of the present invention generally relates is described in U.S. Pat. No. 5,982,572, entitled Method AND APPARATUS FOR ENABLING FAST ACCESS TO A LOGICAL BLOCK ON A TAPE MEDIUM. The prior art reference discloses a method and apparatus for fast access to any logical block on a media not containing logical block addressing. Categorizing marks such as filemarks or setmarks are provided on the tape medium at various points along the medium. The medium is divided up into a plurality of physical blocks. To permit fast access to a logical block on the tape, a connection table in the form of a block map is provided which establishes a relationship between logical blocks and the tapemarks, and defines physical positions of at least some of the tapemarks.

The method of the present invention differs from the above-mentioned prior art method because by establishing unique names for sets of tape volumes using a mechanism called Tapeset; the Tapeset assigns a number that will indicate the first file in each tape volume; a MAXFILES-PERTAPE value is then associated with each file so that locating a required file can be done more efficiently. The prior art method, on the other hand, sets up tapemarks along the tape medium and divides the tape into several partitions without identifying the files stored in these blocks. In order to have fast access using the prior art method, a connection table is provided which establishes the relationship between the partitioned blocks and tapemarks.

Another prior art method to which the method of the present invention generally relates is detailed in U.S. Pat. No. 5,287,232, entitled AUTOMATIC TAPE SEARCHING METHOD. This prior art reference is an automatic (auto) tape searching method that searches the required tape portion fast and automatically by repeating a sequence of operational procedures. The auto tape searching method comprises: a first stage which initializes the port of a microcomputer and the content of a RAM (random access memory), sets the initial values, and controls interrupts at a power-on reset of a video tape recording system; a second stage which checks key input and, for auto random search (ARS) key, performs the auto random search function; a third stage which performs mode checking and, if a present mode needs to accompany the mechanism operation, controls the present mode; and a fourth stage which switches the mode and checks the sensor and an emergency state to put the system in stable condition.

This prior art method is a hardware solution to the quick search problem. Its proposed solution is to automate a searching algorithm that will search the required tape portion; this prior art method utilizes four stages that manipulates RAM content and key inputs, performs mode checking, and evaluates system state conditions. The method of the present invention, on the other hand, is software based but achieves the same goal utilizing a nomenclature system that efficiently locates a specific data file.

Still another prior art clustering system to which the method of the present invention generally relates is detailed in U.S. Pat. No. 5,757,571, entitled FLEXIBLE-CAPACITY SCALING FOR EFFICIENT ACCESS OF ORDERED DATA STORED ON MAGNETIC TAPE MEDIA. This prior art method discloses various data storage formats that help to efficiently locate, read, and write user data stored on magnetic tape media. A tape is formatted by writing multiple segment-headers, free from any interleaved access of user data. Adjacent segment-headers are spaced by a predetermined interval to define multiple data storage segments. Segment-headers all contain a unique key, which is copied into a key index to identify valid segments. After formatting, normal tape accesses can be performed. Without erasing any old headers or data, a new formatting scheme can be established by writing new segment-headers on the tape. The new segment-headers include a new unique key, replacing the previous key in the key index. Previous segment-headers stored on the tape are ignored, since they lack the updated key. Segments may be selectively grouped to provide independently addressable partitions. Mapping between segments and partitions can use a fixed relationship (e.g. one-to-one), or each partition may be variably sized according to the amount of data to be stored therein. Variable-sized partitions may be automatically padded with a selected number of empty segments. Another feature is flexible-capacity scaling, which distributes an ordered set of device blocks on a multi-track magnetic tape medium. The device blocks are bi-directionally stored in a continuous configuration of multiple adjacent stacked serpentine patterns occupying some or all of the tape. This configuration permits sequential access of all device blocks without advancing the tape medium to skip over regions between adjacent device blocks.

The key difference between the prior art method and the method of the present invention is the organization of file-positioning information provided by the method of the present invention. The method of the present invention uses a disk directory file to access files, identify files, and resolve name conflicts when multiple tapes are created with the same name. The disk directory file contains the name of the first file in each volume; a serial number is also associated with each volume. Together these two identifiers are used to limit the search through tape drives.

Still another prior art clustering system to which the method of the present invention generally relates is detailed in U.S. Pat. No. 5,572,378, entitled DIRECT FILE ACCESS SYSTEM FOR MAGNETIC TAPE. This prior art method discloses a direct file access system for a magnetic tape where all data files begin at a designated location on the tape. The direct file access system may be used with a reduced rewind data configuration to decrease data access time. The reduced rewind data configuration divides data files into generally equal portions so that data files begin and end at a designated location on the tape, eliminating rewind sequences. A method and system for reducing the number of tape retensioning passes is included to further decrease access time. This prior art method divides data into equal portions so that all data files start and end on designated locations on the tape. A reduced rewind scheme is then applied to zip through these data blocks to find data. This method, however, uses a linear search that must run through an entire block to locate a specific data file. The method of the present invention, however, assigns numeric values to each file in a data block, reducing the search time from $O(n)$ to $O(1)$. $O(n)$ is a notation for specifying that the performance of an algorithm depends on the length or number of inputs "n". $O(1)$ signifies that regardless of "n" the algorithm performs in time similar to when n=1.

Yet another prior art clustering system to which the method of the present invention generally relates is detailed in U.S. Pat. No. 6,081,875, entitled APPARATUS AND METHOD FOR BACKUP OF A DISK STORAGE SYSTEM. This prior art reference is a backup system and method providing for the creation of a reconciled snapshot backup image of a database while the database, residing on a disk array system, is in use by users. A backup computer running a commercial backup utility is connected between the array system and a tape storage system. While the backup is underway, write requests to the database are suspended until the data currently in those data blocks is copied and stored in an original data cache. Here, the disk system address of the copied block and a pointer to the location of the block in the cache are stored in a map. The backup utility incrementally reads portions of the database from the disk system and forwards those portions to the tape system. Prior to each portion being forwarded to the tape system, all data blocks in the portion which have an address that corresponds to the address of a block in the cache are discarded and replaced with the data from the cache for that address.

This prior art reference is a method to backup data on a disk storage system. It does not deal with the problem addressed by the method of the present invention, that is to say, providing for the efficient locating of specific data files within a storage system.

SUMMARY OF THE INVENTION

It is therefore an object of the present invention to provide a method for tracking files spanning multiple tape reels using fast-locate capable tapedrives.

Still another object of the present invention is to expedite the retrieval of audit files contained on tape when performing a database recovery.

Still another object of the present invention is to create a common name for grouping of audit files spanning one or more tape volumes.

Yet another object of the present invention is to provide positioning information of audit files contained on tape.

The method of the present invention is useful in a computer system including a server accessing a database and connected to a magnetic tape drive. An associated program (the COPYAUDIT utility) executes a method for locating audit files of a database that are backed-up on tape. The method includes the steps of creating a Tapeset for the group of audit files, then initializing a disk directory file to hold positional information of the Tapeset, and finally, locating each of the audit files within the group of audit files using the positional information contained in the disk directory file.

DESCRIPTION OF PREFERRED EMBODIMENT

Before proceeding with a detailed description of the method of the present invention, a background discussion of Tapesets and disk directory files may be helpful. The concept of a Tapeset was specifically created for the present invention. A Tapeset is defined as a grouping of files on a tape. A Tapeset can span multiple reels. Files within a Tapeset can start at the end of one tape reel, and continue at the beginning of another tape reel. The Tapeset number is the identification of tape volumes on which several audit files reside.

A disk directory file is created on the mainframe server to correspond with each Tapeset. The disk directory file will have the Tapeset number as one of the nodes. Thus, there is a mapping between the disk file directory and the Tapeset name. Since the real problem is to get to the right directory in the first place, the Tapeset number is a convenient way to access the right directory. The disk directory also contains positioning information for each file within the Tapeset. This positioning information is used as parameters to fast-locate capable tape drive systems that function to provide fast positioning within a tape volume.

Figure 1:
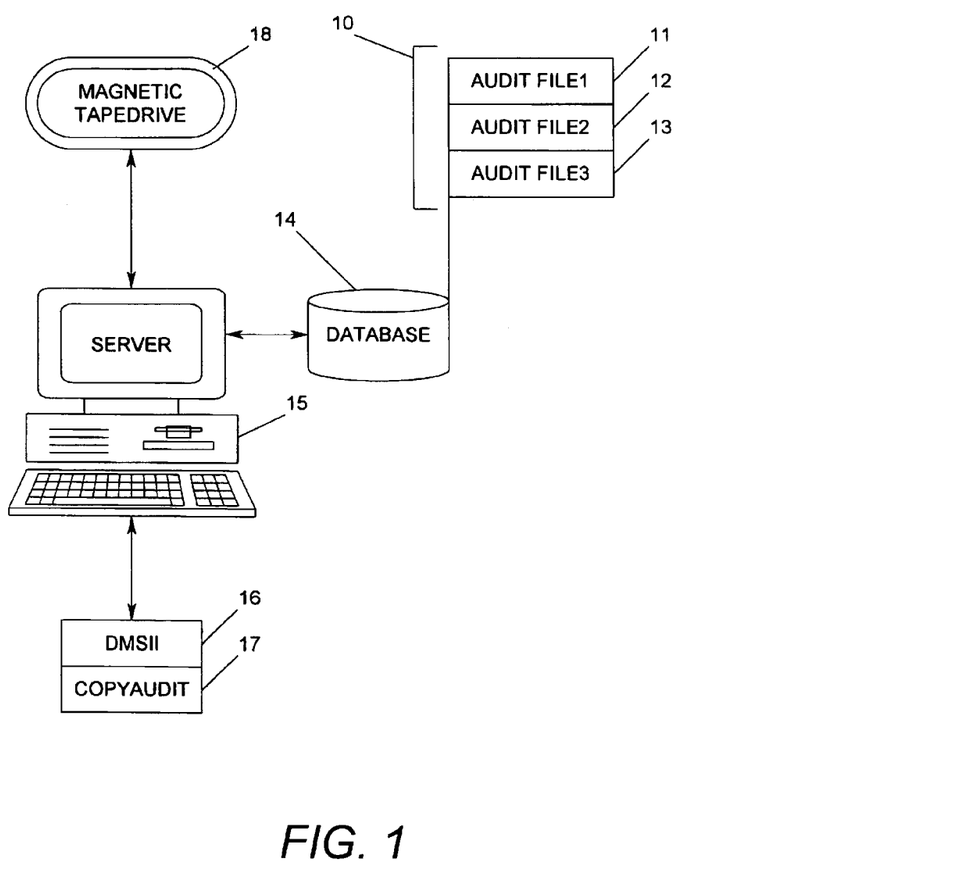
FIG. 1 is a generalized block diagram of a system that may use the method of the present invention.

Referring now to the drawings and FIG. 1 in particular, a block diagram of a computer system is shown including server 15 typically running DMSII Software 16 and COPYAUDIT Software 17. DMSII represents a Data Management System developed by Unisys Corporation described in a publication entitled *Unisys e@action Enterprise Database Server Extended Edition for Clearpath MCP*, and published November, 2000. The COPYAUDIT Software 17 contains the software logic involved for the present invention. Server 15 is connected to database 14. Database 14 generates a collection of audit files 10. Audit files 10 maintain an event history of all transactions occurring on server 15. In this example, audit files 10 are comprised on AuditFile1 11, AuditFile2, 12, and AuditFile3, 13. Server 15 is also connected to a magnetic tapedrive 18, which is used to store a backup copy of the audit files 10. Magnetic tape drive 18 contains a FAST-LOCATE capability, which enables fast cueing to a certain position within a particular tape volume. The FAST-LOCATE capability is a combination of the system software interfaces and tape drive capability. The system software interfaces are described in *Master Control Program (MCP) System Interfaces Programming Reference Manual*, published in October 1999, by the Unisys Corporation.

Figure 2:
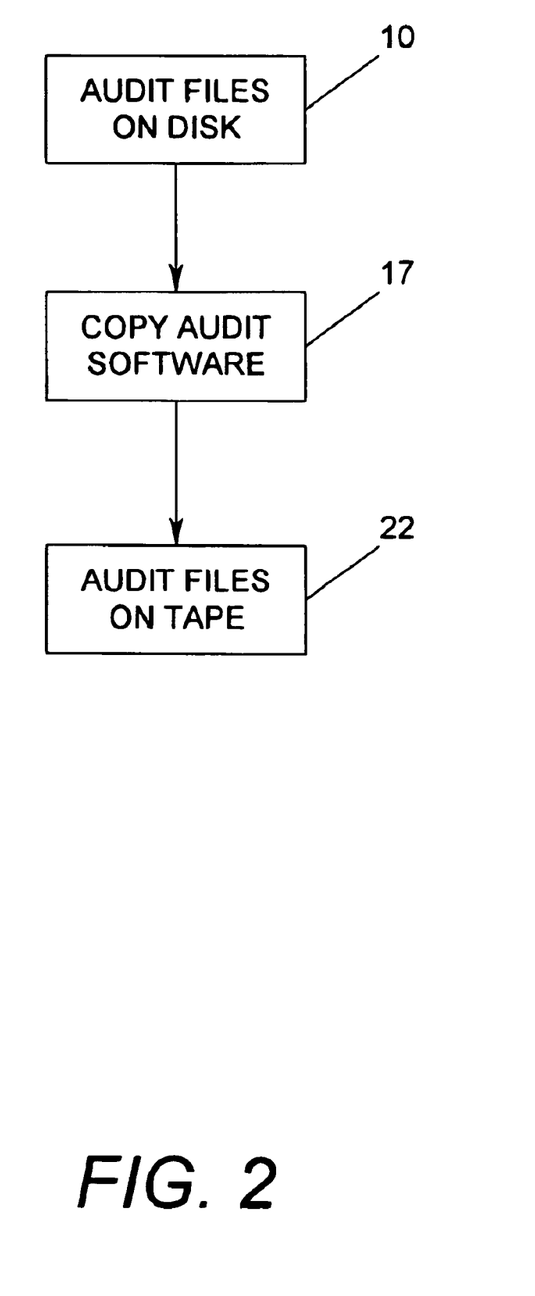
FIG. 2 is a generalized block diagram illustrating the transfer of audit files from disk to tape.

With reference to FIG. 2, a diagram illustrating the transfer of audit files from disk to tape is shown. The audit files on disk 10 are sent through COPYAUDIT Software 17 residing on server 15, and are backed up as audit files on tape at step block 22 using magnetic tape drive 18. COPYAUDIT is a program developed by Unisys Corporation, Blue Bell, Pa., and described in a publication entitled *"Enterprise Database Server for ClearPath MCP Utility Operations Guide"*, published in November, 2000.

Figure 3:
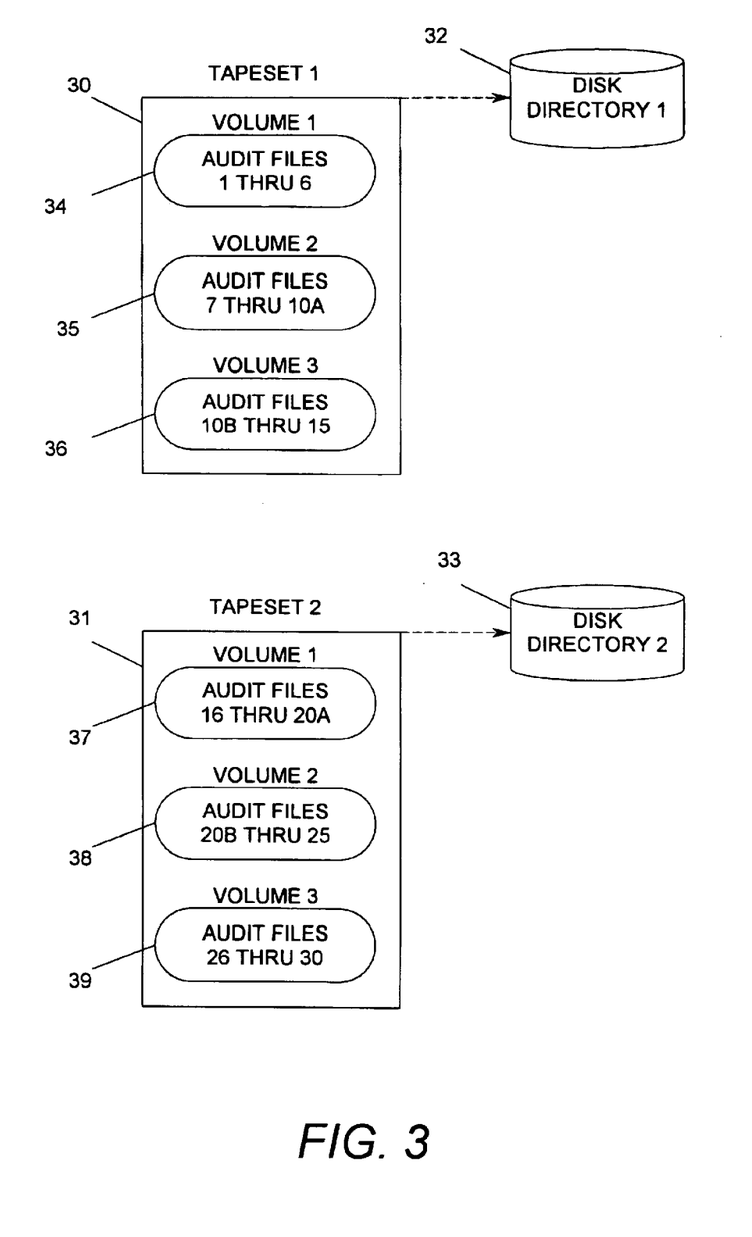
FIG. 3 is a block diagram illustrating a sample of Tapesets and their respective disk directory file.

Referring now to FIG. 3, a block diagram illustrating a sample of Tapesets and their respective disk directory file is shown. The first Tapeset 30 contains three tape volumes of audit files. The first volume 34 contains audit files sequentially numbered 1 through 6. The second volume 35 contains audit files numbered 7 through 10A. The third volume 36 contains audit files 10B through 15. The second volume 35 has the beginning portion of audit file 10 (10A), while the third volume 36 contains the ending portion of audit file 10 (10B). The first Tapeset 30 has a disk directory file 32 associated with it that keeps track of tape volume and audit file position information.

With reference to FIG. 3, a second Tapeset 31 contains three tape volumes of audit files. The first volume 37 contains audit files numbered 16 through 20A. The second tape volume 38 contains audit files numbered 20B through 25. The third tape volume 39 contains audit files numbered 26 through 30. The second Tapeset 31 has a disk directory file 33 associated with it that keeps track of tape volume and audit file position information.

Figure 4:
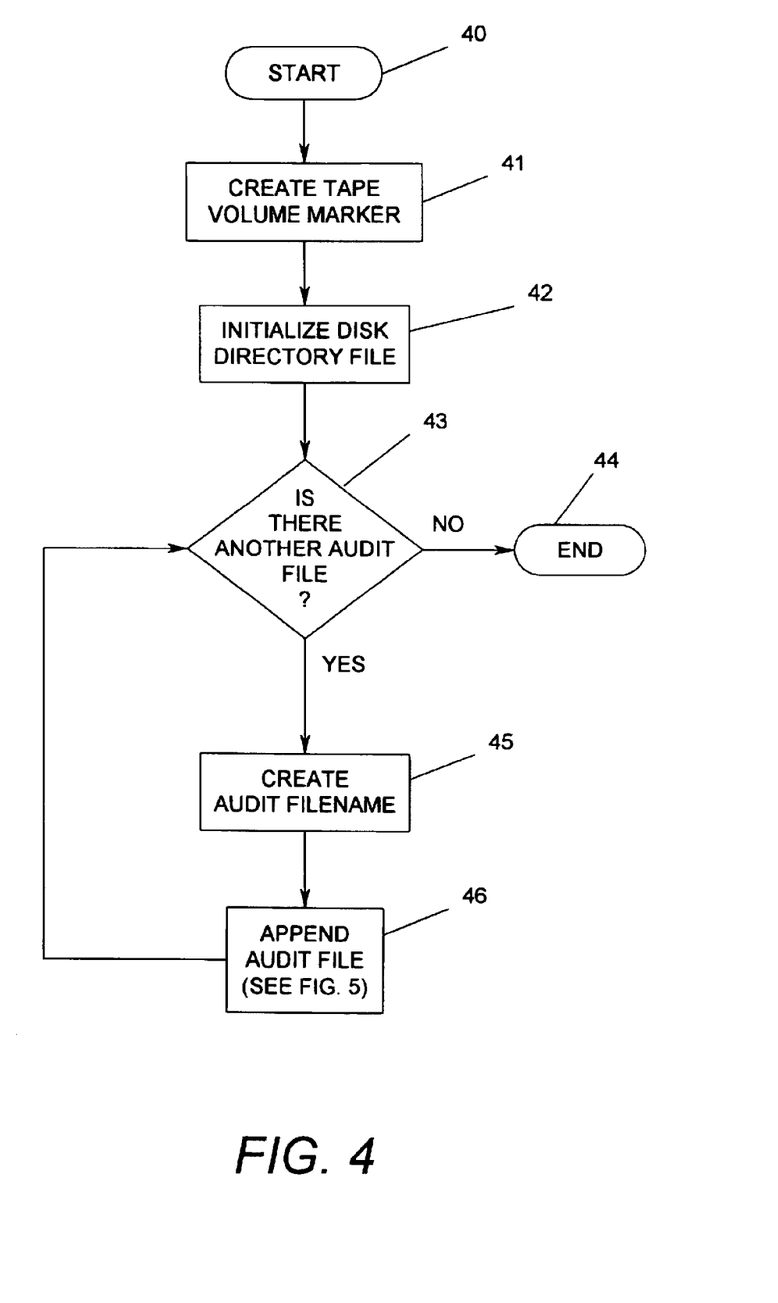
FIG. 4 is a flowchart that illustrates the steps for creating an initial Tapeset.

With reference to FIG. 4, a flowchart that illustrates the steps for creating an initial Tapeset is shown. During this process, a tape volume is created, a disk directory initialized, and an initial collection of audit files are written to tape. The process begins with start bubble 40 and continues with a process step (block 41) of creating a tape volume marker file. Each physical reel (also known as a volume) of a Tapeset contains a tape volume marker file. The process continues by initializing a disk directory file (block 42). In initializing the disk directory file, the process first creates a disk directory file, then inserts a directory record as the first record in the disk directory file. Next, the process continues with an inquiry as to whether or not another audit file from audit files 10 (FIG. 1) on database 14 needs to be appended to the list of audit files on tape step block 22, FIG. 2 (diamond 43). If the answer to this inquiry at diamond 43 is NO, the process exits (end bubble 44). If the answer to this inquiry is YES, the process continues with a process step (block 45) of creating an audit filename. The process then appends the audit file to tape (block 46) and returns to diamond 43. The steps for appending an audit file to tape are further described in FIGS. 5A and 5B.

Figure 5A:
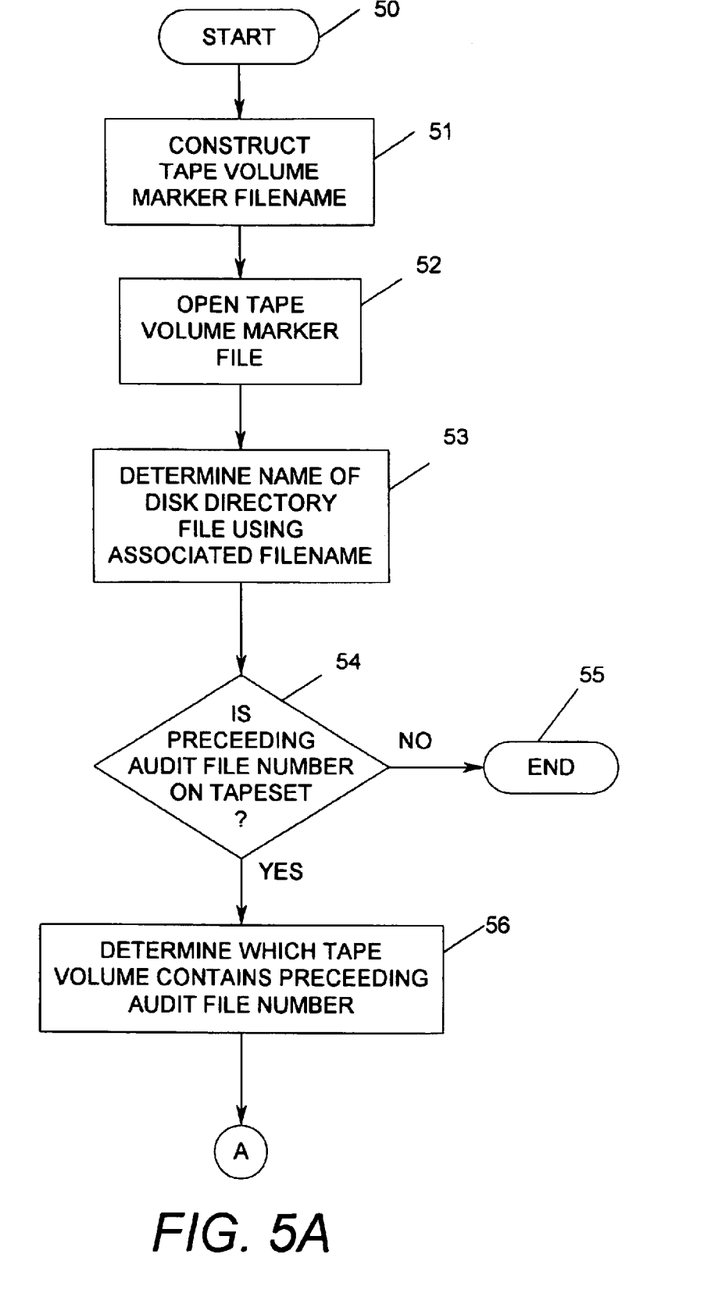
FIGS. 5A and 5B are combined to form a flowchart that illustrates the steps for appending an audit file to a Tapeset.
Figure 5B:
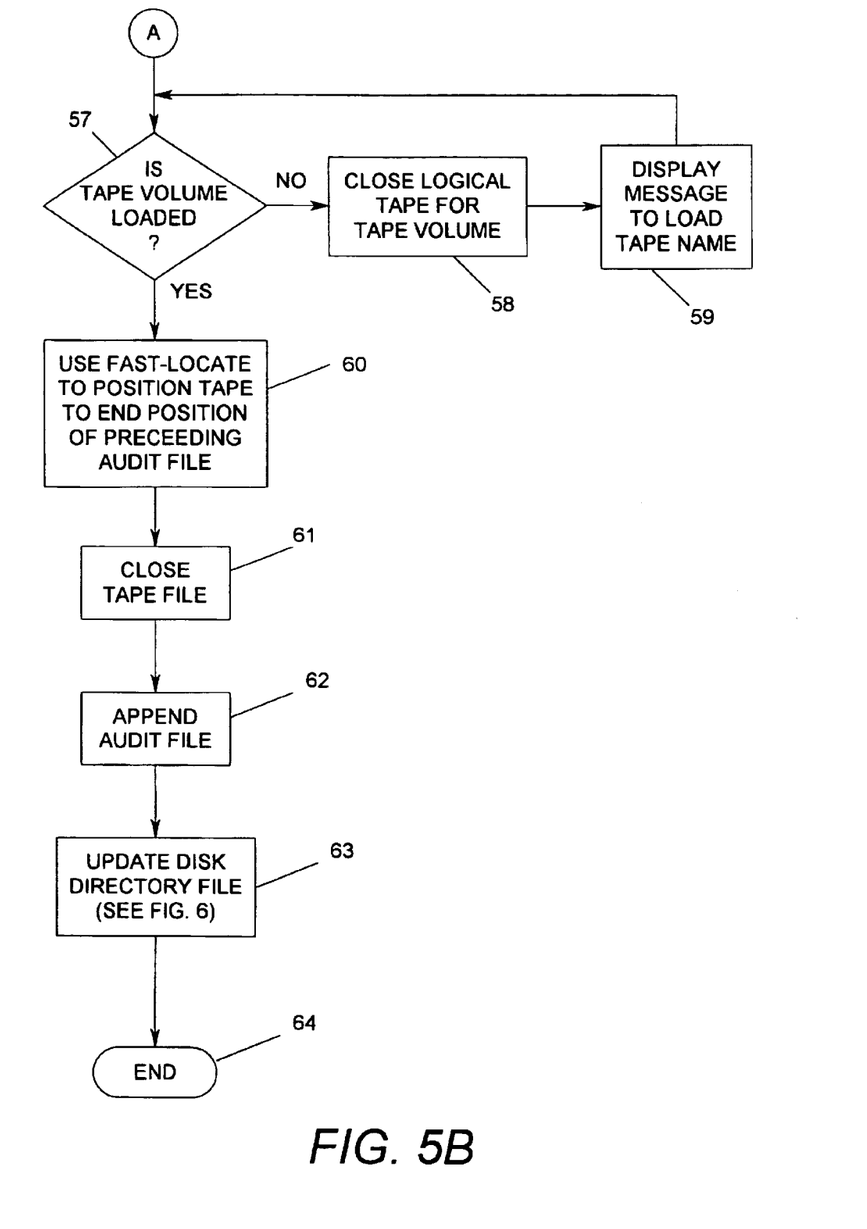

With reference to FIGS. 5A and 5B, there is seen a flowchart that illustrates the steps for appending an audit file to a Tapeset. This process is used for two purposes. First, the process is used for appending audit files when creating an initial Tapeset (refer to FIG. 4). Second, the process is sued to append an audit file, or group of audit files, to an already existing Tapeset. The process begins with start bubble 50 and continues with a process step (block 51) of constructing a tape volume marker filename. The process uses the database name and Tapeset number when constructing the tape volume marker filename. Next, the process opens or creates the tape volume marker file by calling standard operating system functions (52). The process continues with a process step (block 53) of determining the name of the disk directory file. The process determines the name of the disk directory file by accessing an Associated Filename attribute on the tape volume. The Associated Filename attribute contains the exact location (i.e. title) of the disk file containing all the information about all the tape volumes comprising the Tapeset in question and also all the information about all the audit files contained in the Tapeset. All volumes of the Tapeset inherit this attribute. Among the important pieces of data stored in the disk file are the first and last audit file numbers in the Tapeset and information about all the volumes in the Tapeset. After determining the name of the disk directory file, step block 53, the process continues with an inquiry as to whether or not the audit file number directly preceding the audit file number in question is found within the Tapeset (diamond 54). Because all audit files are sequential, the process makes this determination by checking if the preceding audit file number is less than the first audit file number within the Tapeset, or greater than the last audit file number within the Tapeset. If the answer to the inquiry posed by diamond 54 is no, the process exits (end bubble 55). If the answer to this inquiry is yes, the process continues by determining which tape volume within the Tapeset contains the preceding audit file number (block 56). Since the operating system could assign to the COPYAUDIT task any one of the tape volumes belonging to the Tapeset (the multi-reel case), it is imperative that the disk file contain sufficient information to find the other tape volumes in case a volume belonging to the Tapeset but not containing the required audit file is assigned to the program by the operating system. Each Volume Record entry in the disk directory file contains the first and last audit file numbers on that volume and the list of all audit files present on that volume. Thus, a simple scan of the disk file through the Volume Record entries reveals which particular tape reel contains the audit file in question. The Volume Record entry containing the audit file in question is examined and the physical attributes (serial number, cycle and version) of the volume extracted. In addition, the Audit File Record entry is examined for the required attributes, namely, the 'starting' and 'ending' positions of the audit file, extracted.

With reference to FIG. 5B, the process continues with an inquiry as to whether or not the tape volume containing the preceding audit file number is loaded (diamond 57). If the answer to this inquiry is NO, the process closes the logical tape for the loaded tape volume (block 58), displays a message to load the needed tape volume name with the required attributes (serial number cycle, version) (block 59), and returns to decision diamond 57.

If the answer to the inquiry at diamond 57 YES, the process continues with a process step (block 60), of using the fast locate capability of the tape drive to position the tape drive from the beginning of the tape volume to the end position of the preceding audit file within the tape volume. The process then closes the tape file (block 61) and appends the audit file to tape (block 62). Next, the process updates the disk directory file (block 63). The steps involved with updating the disk directory file are further described in FIG. 6. After updating the disk directory file, the process exits (end bubble 64).

Figure 6:
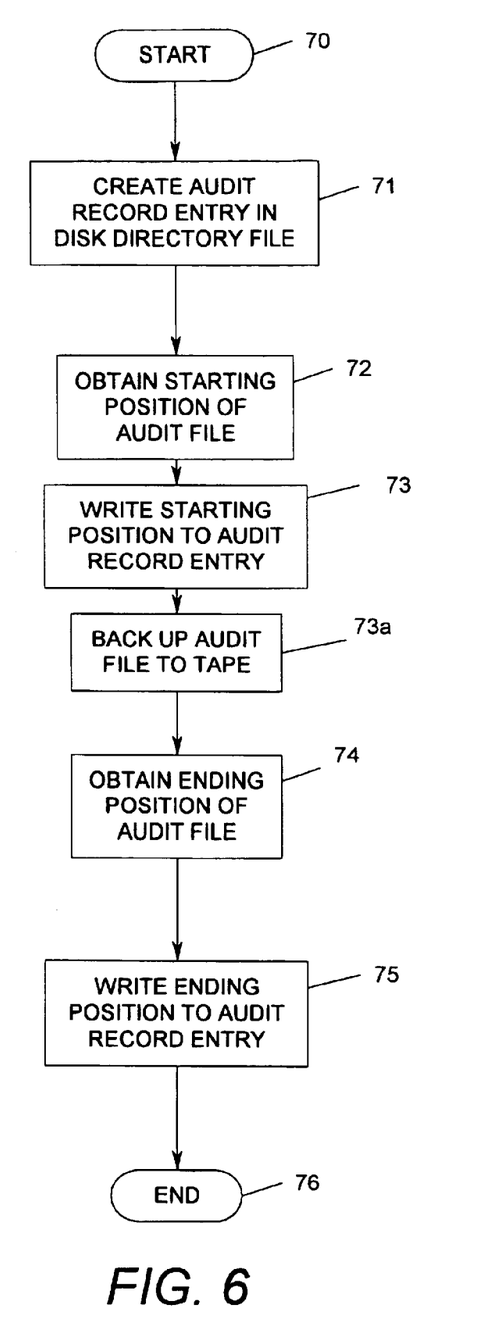
FIG. 6 is a flowchart that illustrates the steps for updating the disk directory file.

Referring now to FIG. 6, the steps for updating the disk directory file are shown. The process begins with start bubble 70 and continues with a process step (block 71) of creating an audit record entry in the disk directory file. The process then obtains a starting position of the audit file based on the audit file number (block 72). Next, the process writes the starting position of the audit file to the audit record entry (block 73). Then at step 73a, there occurs the actual process of backing up the audit file to tape. The process then obtains the ending position of the audit file (block 74) and writes the ending position to the audit record entry (block 75). Before writing any data to the tape, the program creates an Audit Record entry in the disk file directory at the end of the current Audit record entries. It invokes the operating system directive, READPOSITION_DIRECT to obtain the "starting" position of the <audit file number being appended> and records it in the Audit Record entry. When the program finishes appending the audit file, it invokes the same operating system directive to obtain the "ending" position of the <audit file number being appended> and records it in the Audit Record entry. It updates the Directory Record entry and the Volume Record entry for the first and last audit file numbers. The process then exits (end bubble 76).

Figure 7A:
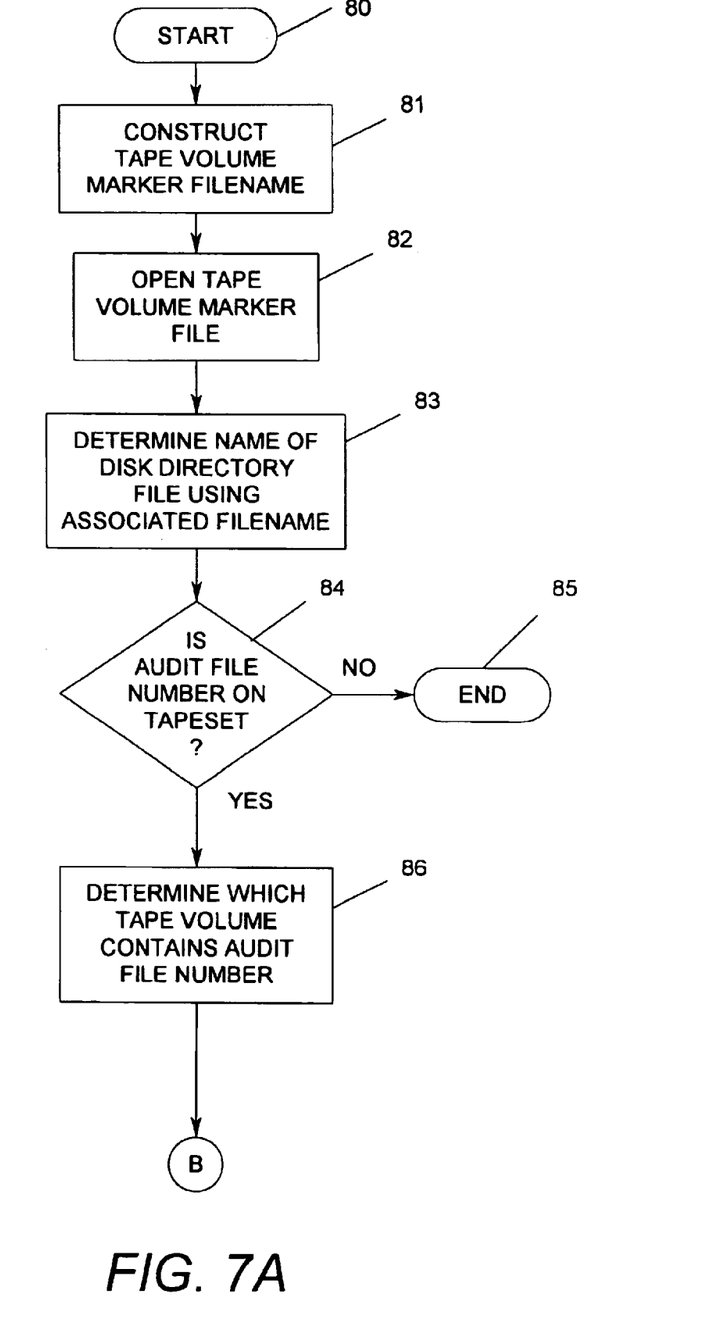
FIGS. 7A and 7B are combined to form a flowchart that illustrates the steps for retrieving an audit file from a Tapeset.
Figure 7B:
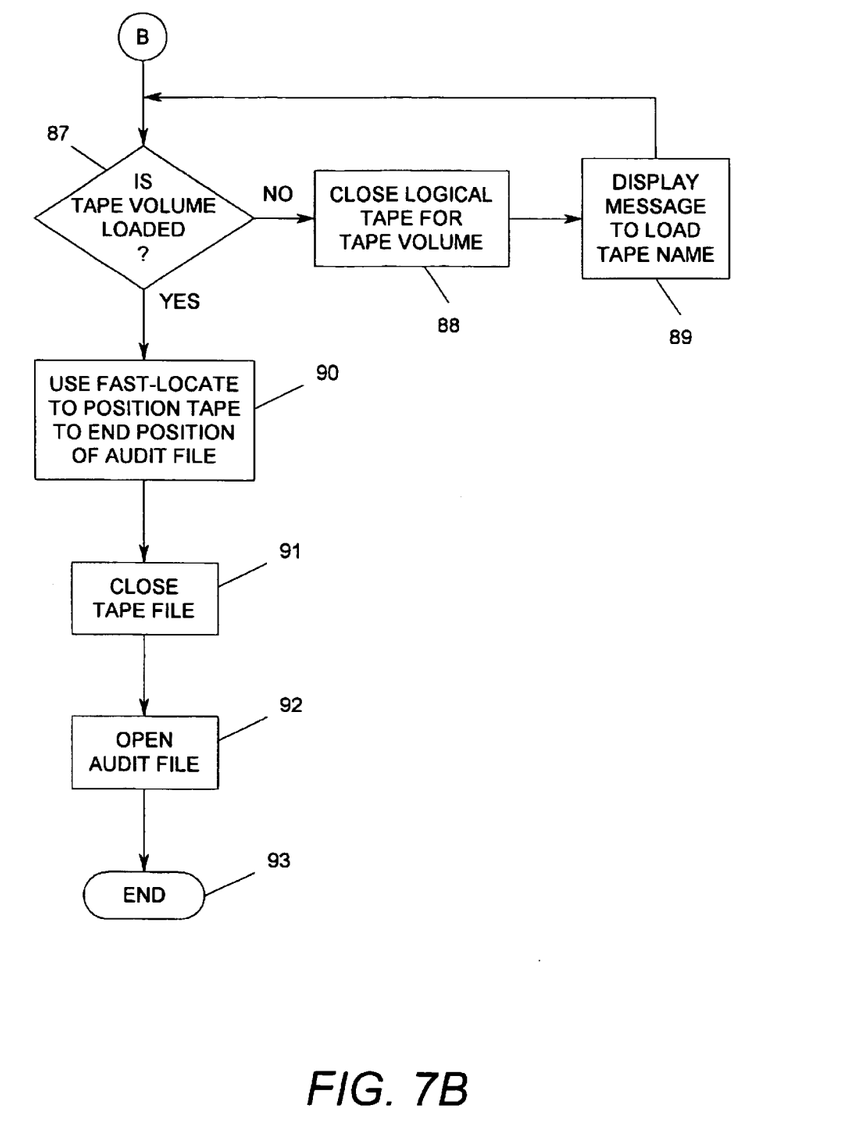

With reference to FIGS. 7A and 7B, the routine for retrieving an audit file from a Tapeset is shown. The process begins with start bubble 80 followed by a process step (block 81) of constructing a tape volume marker filename. For example, this file name might be designated as: <Database Name>/TAPESET<n>. The process uses the database name and Tapeset number (an integer) when constructing the tape volume marker filename. Next, the process opens the tape volume marker file by calling standard operating system functions (block 82), (i.e., File Open). The process then determines the name of the disk directory file using the Associated Filename attribute at step 83. As discussed above, the Associated Filename attribute contains the exact location (i.e. title) of the disk file containing all the information about all the tape volumes comprising the Tapeset in question and also all the information about all the audit files contained in the Tapeset. The process then continues with an inquiry as to whether or not the audit file number in question is found within the Tapeset (diamond 84). Because all audit files are sequential, the process makes this determination by checking if the audit file number is less than the first audit file number within the Tapeset, or greater than the last audit file number within the Tapeset. If the answer to the inquiry posed by decision diamond 84 is NO, the process exits (end bubble 85). If the answer to this inquiry is YES, the process determines which tape volume contains the audit file number (block 86).

Since the operating system could assign to the COPYAUDIT utility program any one of the tape volumes belonging to the Tapeset (the multi-reel case), it is imperative that the disk file contain sufficient information to find the other tape volumes in case a (volume belonging to the Tapeset but not containing the required audit file) is assigned to the COPYAUDIT utility program by the operating system. Each Volume Record entry in the disk directory file contains the first and last audit file numbers on that volume and the list of all audit files present on that volume. Thus, a simple scan of the disk file through the Volume Record entries reveals which particular tape reel contains the audit file in question. The Volume Record entry containing the audit file in question is examined and the physical attributes (serial number, cycle and version) of the volume extracted. In addition the Audit File Record entry is examined for the required attributes involving namely, the 'starting' and 'ending' positions of the audit file, extracted.

With reference to FIG. 7B, the process continues with an inquiry as to whether or not the needed tape volume is currently loaded (diamond 87). If the answer to this inquiry is NO, the process closes the logical tape for the current tape volume (block 88), displays a message to load the tape volume (with the required identifying attributes—serial number, cycle and version), (block 89) and returns to decision diamond 87.

If the answer to the inquiry at diamond 87 is YES, the process uses the fast-locate capabilities of the tape drive to move from the beginning of the tape volume to the ending position of the desired audit file minus 1 on the tape volume (block 90). Next, the process closes the tape file (block 91) and opens the desired audit file on the tape volume (block 92). Opening the audit file functions to create a logical association between the program and the physical file on tape. The process then exits (end bubble 93) after retrieving the desired audit files.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications or embodiments that fall within the true scope of the invention.

What is claimed is:

1. In a computer system including a server accessing a database and a magnetic tape drive, a method for locating a group of audit files from said database on tape, said method comprising the steps of:
    (a) creating a Tapeset for said group of audit files;
    (b) initializing a disk directory file to hold positional information of said tapeset;
    (c) for each audit file within said group of audit files, locating said audit file within said Tapeset using said positional information, wherein said step of locating said audit file within said Tapeset includes the steps of:
        (c1) determining if said step of locating said audit file is for appending or for retrieving said audit file;
        (c2) if said step of locating said audit file is for appending purposes, appending said audit file to said Tapeset;
        (c3) if said step of locating said audit file is for retrieving purposes, retrieving said audit file from said Tapeset.

2. The method as in claim 1 wherein said group of audit files consists of one or more audit files.

3. The method as in claim 1 wherein said step of locating said audit files within said Tapeset also applies to an already existing Tapeset and an already existing disk directory file.

4. The method as in claim 1 wherein said step for creating said Tapeset includes the steps of:
    (a1) selecting a name to uniquely identify said group of audit files;
    (a2) creating a tape volume marker file with said name;
    (a3) writing said tape volume marker file to each volume within said Tapeset.

5. The method as in claim 1 wherein said step for initializing said disk directory file includes the steps of:
    (b1) creating a disk directory file;
    (b2) inserting a disk record as a first entry in said directory file.

6. In a computer system including a server accessing a database and a magnetic tape drive, a method for locating a group of audit files from said database on tape, said method comprising the steps of:
    (a) creating a Tapeset for said group of audit files;
    (b) initializing a disk directory file to hold positional information of said Tapeset;
    (c) for each audit file within said group of audit files, locating said audit file within said Tapeset using said positional information;
        (c1) determining if said step of locating said audit file is for appending or for retrieving said audit file;
        (c2) if said step of locating said audit file is for appending purposes, appending said audit file to said Tapeset;
        (c2a) opening said tape volume marker file;
        (c2b) opening said disk directory file;
        (c2c) determining a tape volume within said Tapeset for an audit file number preceding said audit file using information from said disk directory file;
        (c2d) if said tape volume is not loaded on said magnetic tape drive, closing a logical tape for said tape volume and displaying a message to load said tape volume;
        (c2e) fast-locating to an end position of said preceding audit file number using information from said disk directory file;
        (c2f) closing said logical tape for said tape volume;
        (c2g) appending said audit file at said end position;
        (c2h) updating said disk directory file with information of said audit file message to load said tape volume;
        (c3) if said step of locating said audit file is for retrieving purposes, retrieving said audit file from said Tapeset.

7. The method as in claim 6 wherein said step (c3) of retrieving said audit file includes the steps of:
    (c3a) opening said tape volume marker file;
    (c3b) opening said disk directory file;
    (c3c) determining a tape volume within said Tapeset for an audit file number matching said audit file using information from said disk directory file;
    (c3d) if said tape volume is not loaded on said magnetic tape drive, closing a logical tape for said tape volume and displaying a message to load said tape volume;
    (c3e) fast-locating to an end position of said matching audit file number using information from said disk directory film;

(c3f) closing said logical tape for said tape volume;

(c3g) opening said audit file at said start position of said matching audit file number.

8. The method as in claim 6 wherein said step (c2b) of updating said disk directory file with information of said audit file includes the steps of:

(c2ha) creating an audit record entry in said disk directory file;

(c2hb) obtaining a starting position of said audit file;

(c2hc) recording said starting position into said audit record entry;

(c2hd) obtaining an end position of said audit file;

(c2he) recording said end position into said audit record entry.

9. A storage medium encoded with machine-readable computer program code for locating a group of audit files from a database maintained on tape, wherein, when the computer program code is executed by a computer, the computer performs the steps of:

(a) creating a Tapeset for said group of audit files;

(b) initializing a disk directory file to hold positional information of said Tapeset;

(c) for each audit file within said group of audit files, locating said audit file within said Tapeset and including the steps of:

(c1) determining if said step of locating said audit file is for appending or for retrieving said audit file;

(c2) if said step of locating said audit file is for appending purposes, appending said audit file to said Tapeset which includes the steps of:

(c2a) opening said tape volume marker file;

(c2b) opening said disk directory file;

(c2c) determining a tape volume within said Tapeset for an audit file number preceding said audit file using information from said disk directory file;

(c2d) if said tape volume is not loaded on said magnetic tape drive, closing a logical tape for said tape volume and displaying a message to load said tape volume;

(c2e) fast-locating to an end position in said tape volume of said preceding audit file number using information from said disk directory file;

(c2f) closing said logical tape for said tape volume;

(c2g) appending said audit file in said tape volume at said end position;

(c2h) updating said disk directory file with information of said audit file.

(c3) if said step of locating said audit file is for retrieving purposes, retrieving said audit file from said Tapeset.

10. The method as in claim 9 wherein said step (c3) of retrieving said audit file includes the steps of:

(c3a) opening said tape volume marker file;

(c3b) opening said disk directory file;

(c3c) determining a tape volume within said Tapeset for an audit file number matching said audit file using information from said disk directory file;

(c3d) if said tape volume is not loaded on said magnetic tape drive, closing a logical tape for said tape volume and displaying a message to load said tape volume;

(c3e) fast-locating to an end position of said matching audit file number using information from said disk directory file;

(c3f) closing said logical tape for said tape volume;

(c3g) opening said audit file at said end position.

11. The method as in claim 9 wherein said step (c2h) of updating said disk directory file with information of said audit file includes the steps of:

(c3a) creating an audit record entry in said disk directory file;

(c3b) obtaining a starting position of said audit file;

(c3d) recording said starting position into said audit record entry;

(c3e) obtaining an end position of said audit file;

(c3f) recording said end position into said audit record entry.

* * * * *